US011972721B2

(12) United States Patent
Lee et al.

(10) Patent No.: US 11,972,721 B2
(45) Date of Patent: Apr. 30, 2024

(54) DISPLAY DEVICE

(71) Applicant: Samsung Display Co., Ltd., Yongin-Si (KR)

(72) Inventors: Jae Hoon Lee, Yongin-si (KR); Kyoung Ho Lim, Yongin-si (KR); Seung Ho Park, Yongin-si (KR); Hee Sook Park, Yongin-si (KR); Sang Myeon Han, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/948,787

(22) Filed: Sep. 20, 2022

(65) Prior Publication Data

US 2023/0138436 A1 May 4, 2023

(30) Foreign Application Priority Data

Nov. 3, 2021 (KR) ........................ 10-2021-0150045

(51) Int. Cl.
*G09G 3/32* (2016.01)

(52) U.S. Cl.
CPC ....... *G09G 3/32* (2013.01); *G09G 2300/0842* (2013.01); *G09G 2320/0233* (2013.01); *G09G 2320/0257* (2013.01); *G09G 2320/0271* (2013.01); *G09G 2320/043* (2013.01)

(58) Field of Classification Search
None
See application file for complete search history.

(56) References Cited

U.S. PATENT DOCUMENTS

| | | | | |
|---|---|---|---|---|
| 9,613,563 B2 | 4/2017 | Seong et al. | | |
| 2006/0077136 A1* | 4/2006 | Cok | G09G 3/3216 | 345/76 |
| 2016/0063917 A1* | 3/2016 | Kondo | G09G 3/3208 | 345/76 |
| 2017/0076661 A1* | 3/2017 | Zhang | G09G 3/2003 | |
| 2017/0345377 A1* | 11/2017 | Oh | G09G 3/3291 | |
| 2018/0151119 A1* | 5/2018 | Lee | G09G 3/3233 | |
| 2018/0247588 A1* | 8/2018 | Lee | G09G 3/3225 | |
| 2022/0139311 A1* | 5/2022 | Yoo | G09G 3/3233 | 345/690 |
| 2022/0157234 A1* | 5/2022 | Kim | G09G 3/3208 | |
| 2022/0208056 A1* | 6/2022 | Baek | G09G 3/20 | |

FOREIGN PATENT DOCUMENTS

| | | |
|---|---|---|
| KR | 10-2105102 B1 | 4/2020 |
| KR | 10-2320676 B1 | 11/2021 |

* cited by examiner

*Primary Examiner* — Patrick N Edouard
*Assistant Examiner* — Peijie Shen
(74) *Attorney, Agent, or Firm* — Innovation Counsel LLP

(57) ABSTRACT

A display device is disclosed that includes pixels, a memory, and a degradation compensator. The pixels include light emitting elements. The memory is operable to store degradation information including degradation degrees of the light emitting elements. The degradation compensator is operable to receive the degradation information and generate output grayscales by changing each of input grayscales of the pixels in proportion to each of the degradation degrees. The degradation compensator includes a degradation information changer for changing the degradation information by decreasing a degradation degree having a variation greater than a threshold value among variations of the degradation degrees.

15 Claims, 11 Drawing Sheets

LUT1

AGE IGV OGV

| AGE | 0 | 1 | 2 | 3 | ··· | G0 | ··· | 255 |
|---|---|---|---|---|---|---|---|---|
| -3 | A(-3) | B(-3) | C(-3) | D(-3) | ··· | G(-3) | ··· | Z(-3) |
| -2 | A(-2) | B(-2) | C(-2) | D(-2) | ··· | G(-2) | ··· | Z(-2) |
| -1 | A(-1) | B(-1) | C(-1) | D(-1) | ··· | G(-1) | ··· | Z(-1) |
| 0 | A0 | B0 | C0 | D0 | ··· | G0 | ··· | Z0 |
| ⋮ | ⋮ | ⋮ | ⋮ | ⋮ | ··· | ⋮ | ··· | ⋮ |
| 30 | A30 | B30 | C30 | D30 | ··· | G30 | ··· | Z30 |
| ⋮ | ⋮ | ⋮ | ⋮ | ⋮ | ··· | ⋮ | ··· | ⋮ |
| 1020 | A1020 | B1020 | C1020 | D1020 | ··· | G1020 | ··· | Z1020 |

AGE2S: rows -3 to -1; AGE1S: rows 0 to 1020

FIG. 10

LUT2

IGV

AGE

OGV

| | | | | | | | | |
|---|---|---|---|---|---|---|---|---|
| | 0 | 1 | 2 | 3 | ··· | G0 | ··· | 255 |
| 0 | A0 | B0 | C0 | D0 | ··· | G0 | ··· | Z0 |
| 1 | A1 | B1 | C1 | D1 | ··· | G1 | ··· | Z1 |
| 2 | A2 | B2 | C2 | D2 | ··· | G2 | ··· | Z2 |
| 3 | A3 | B3 | C3 | D3 | ··· | G3 | ··· | Z3 |
| ⋮ | ⋮ | ⋮ | ⋮ | ⋮ | ··· | ⋮ | ··· | ⋮ |
| 30 | A30 | B30 | C30 | D30 | ·⋮· | G30 | ·⋮· | Z30 |
| ⋮ | ⋮ | ⋮ | ⋮ | ⋮ | ·⋮· | ⋮ | ·⋮· | ⋮ |
| 1023 | A1023 | B1023 | C1023 | D1023 | ··· | G1023 | ··· | Z1023 |

DISPLAY DEVICE

CROSS-REFERENCE TO RELATED APPLICATION

The present application claims priority under 35 U.S.C. § 119(a) to Korean patent application 10-2021-0150045 filed on Nov. 3, 2021, in the Korean Intellectual Property Office, the entire disclosure of which is incorporated herein by reference.

BACKGROUND

1. Technical Field

The present disclosure relates to display devices. More particularly, the present disclosure relates to adjusting luminance of light emitting elements of display devices.

2. Related Art

With the development of information technologies, the importance of a display device which is a connection medium between a user and information increases. Accordingly, display devices such as a liquid crystal display device and an organic light emitting display device are increasingly used.

Each pixel of a display device may include at least one light emitting element. The light emitting element is degraded as a period in which the light emitting element is used increases. Therefore, a larger amount of driving current is required to exhibit the same luminance.

Meanwhile, when a fixed partial image such as a logo is displayed for a long period of time, an afterimage may occur in a corresponding portion. Therefore, it would be beneficial to decrease the luminance of light emitting elements at the corresponding portion.

SUMMARY

Embodiments of the present disclosure may provide a display device capable of balancing a luminance increase for counteracting degradation and a luminance decrease for preventing an afterimage. Such a display device may allow omitting an image processing process for searching for a logo.

An embodiment of a display device includes pixels, a memory, and a degradation compensator. The pixels include light emitting elements. The memory is configured to store degradation information including degradation degrees of the light emitting elements. The degradation compensator is configured to receive the degradation information, and generate output grayscales by changing each of input grayscales of the pixels in proportion to each of the degradation degrees. The degradation compensator includes a degradation information changer configured to change the degradation information by decreasing a degradation degree having a variation greater than a threshold value among variations of the degradation degrees.

The degradation compensator may further include a grayscale changer configured to generate the output grayscales corresponding to the input grayscales and the changed degradation information with reference to a first lookup table.

The first lookup table may include output grayscales corresponding to first degradation degrees greater than or equal to an initial degradation degree set initially with respect to the pixels and output grayscales corresponding to second degradation degrees smaller than the initial degradation degree.

The output grayscales corresponding to the second degradation degrees in the first lookup table may be smaller than or equal to corresponding input grayscales.

The output grayscales corresponding to the first degradation degrees in the first lookup table may be greater than or equal to corresponding input grayscales.

The display device may further include a temperature sensor configured to provide temperature information. The degradation compensator may further include a degradation information generator configured to update the degradation information by calculating current degradation amounts, based on the temperature information and the input grayscales and accumulating the current degradation amounts in the degradation information.

The degradation compensator may further include a degradation variation detector configured to calculate the variations by using differences between degradation degrees of current degradation information and degradation degrees of past degradation information, and provide position information of a pixel corresponding to the variation greater than the threshold value among the variations.

The degradation information changer may change the degradation information by decreasing the degradation degree corresponding to the position information.

The degradation compensator may further include a degradation variation detector configured to calculate the variations by using differences between degradation degrees of current degradation information and degradation degrees of past degradation information, and provide position information of a pixel corresponding to the variation greater than the threshold value among the variations and a difference value between the variation and peripheral variations.

The degradation information changer may change the degradation information by decreasing the degradation degree corresponding to the position information in proportion to the difference value.

The degradation information changer may decrease the degradation degree corresponding to the position information to become smaller as the difference value becomes larger.

An embodiment of a display device includes pixels, a memory, and a degradation compensator. The pixels include light emitting elements. The memory is configured to store degradation information including degradation degrees of the light emitting elements. The degradation compensator is configured to receive the degradation information, and generate output grayscales by changing each of input grayscales of the pixels in proportion to each of the degradation degrees. In operation, when a degradation degree having a variation greater than a threshold value among variations of the degradation degrees is detected, the degradation compensator applies a gain value to at least one of the output grayscales.

The gain value may have a range of and including 0 to 1.

The display device may further include a temperature sensor configured to provide temperature information. The degradation compensator may further include a degradation information generator configured to update the degradation information by calculating current degradation amounts, based on the temperature information and the input grayscales and accumulating the current degradation amounts in the degradation information.

The degradation compensator may further include a degradation variation detector configured to calculate the variations by using differences between degradation degrees of current degradation information and degradation degrees of past degradation information, and provide position information of a pixel corresponding to the variation greater than the threshold value among the variations.

The degradation compensator may further include: a gain generator configured to generate the gain value in proportion to the difference value; and a grayscale changer configured to commonly apply the gain value to all the output grayscales.

The gain generator may decrease the gain value to become smaller as the difference value becomes larger.

The degradation compensator may further include a degradation variation detector configured to calculate the variations by using differences between degradation degrees of current degradation information and degradation degrees of past degradation information, and provide position information of a pixel corresponding to the variation greater than the threshold value among the variations and a difference value between the variation and peripheral variations.

The degradation compensator may further include: a gain generator configured to generate the gain value corresponding to the position information in proportion to the difference value; and a grayscale changer configured to apply the gain value to some of the output grayscales, which correspond to the position information.

The gain generator may decrease the gain value corresponding to the position information to become smaller as the difference value becomes larger.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 10 is a diagram illustrating a second lookup table in accordance with an embodiment of the present disclosure.

DETAILED DESCRIPTION

Figure 1:
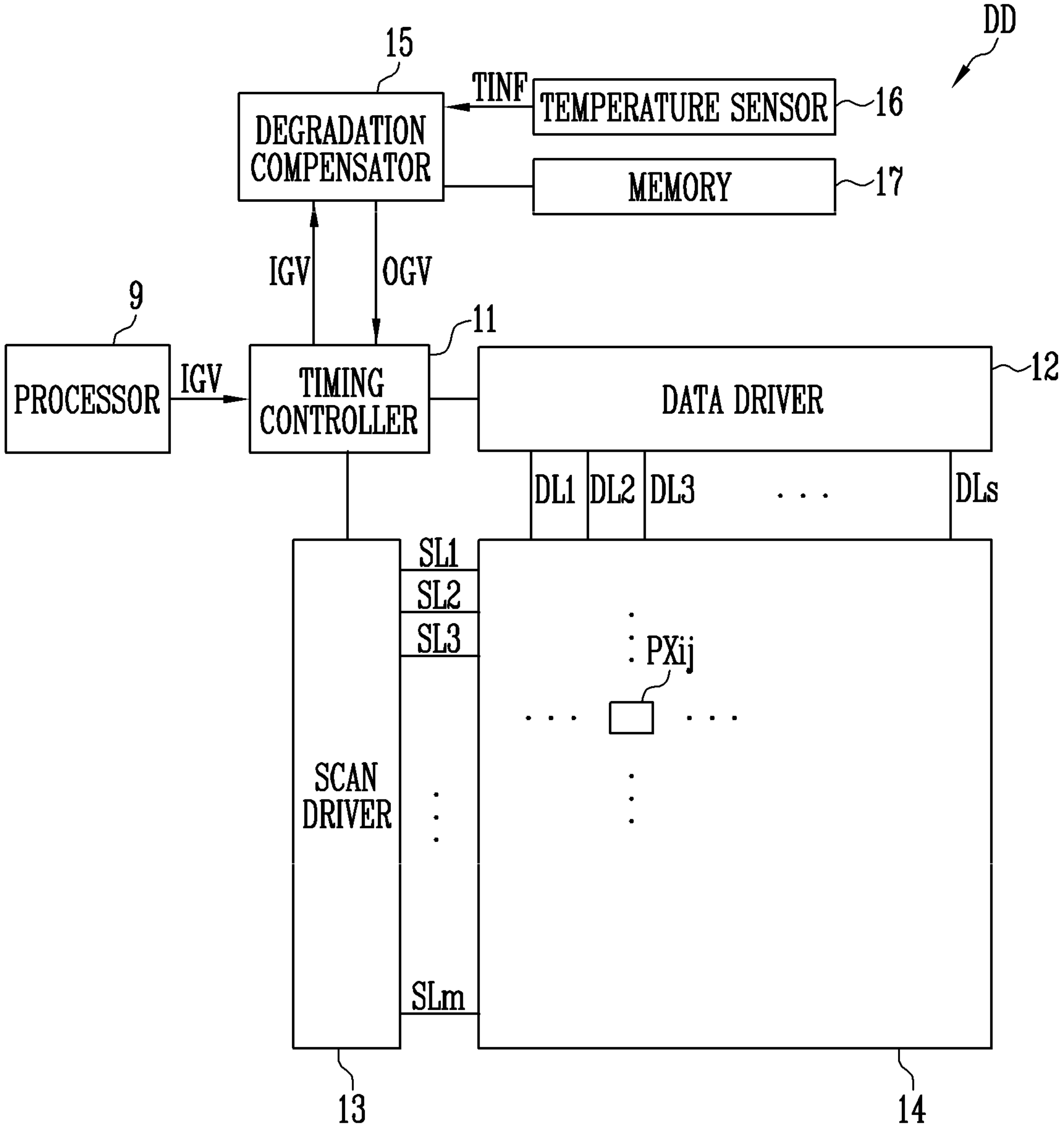
FIG. 1 is a diagram illustrating a display device in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially" is omitted.

FIG. 1 is a diagram illustrating a display device in accordance with an embodiment of the present disclosure.

Referring to FIG. 1, the display device DD in accordance with the embodiment of the present disclosure may include a timing controller 11, a data driver 12, a scan driver 13, a pixel unit 14, a degradation compensator 15, a temperature sensor 16, and a memory 17.

The timing controller 11 may receive, with respect to each image frame, timing signals such as a vertical synchronization signal, a horizontal synchronization signal, and a data enable signal, and input grayscales IGV from a processor 9 (e.g., a Graphics Processing Unit (GPU), a Central Processing Unit (CPU), an Application Processor (AP), or the like).

The timing controller 11 may supply control signals to each of the data driver 12 and the scan driver 13, corresponding to specifications of each of the data driver 12 and the scan driver 13. Also, the timing controller 11 may provide the input grayscales IGV to the degradation compensator 15, and receive output grayscales OGV from the degradation compensator 15. The timing controller 11 may provide the output grayscales OGV to the data driver 12.

Meanwhile, the timing controller 11 and the degradation compensator 15 may be configured as independent hardwares, and be configured as one integrated hardware. Meanwhile, the degradation compensator 15 may be implemented in a software manner in the timing controller 11.

In another embodiment, unlike as shown in FIG. 1, the timing controller 11 may provide the input grayscales IGV to the data driver 12. The degradation compensator 15 may receive the input grayscales IGV from the data driver 12, and provide the output grayscales OGV to the data driver 12. Hereinafter, for convenience of description, the embodiment shown in FIG. 1 will be mainly described.

The data driver 12 may generate data voltages to be provided to data lines DL1, DL2, DL3, . . . , and DLs by using the output grayscales OGV and the control signals. For example, the data driver 12 may sample the output grayscales OGV by using a clock signal, and apply data voltages corresponding to the output grayscales OGV to the data lines DL1 to DLs in units of pixel rows. A pixel row may mean pixels connected to the same scan line. Here, s may be an integer greater than 0.

The scan driver 13 may receive a clock signal, a scan start signal, and the like from the timing controller 11, and generate scan signals to be provided to scan lines SL1, SL2, SL3, . . . , and SLm. Here, m may be an integer greater than 0.

The scan driver 13 may sequentially supply the scan signals having a pulse of a turn-on level to the scan lines SL1 to SLm. The scan driver 13 may include scan stages configured in the form of shift registers. The scan driver 13 may generate the scan signals in a manner than sequentially transfer the scan start signal in the form of a pulse of a turn-on level to a next scan stage under the control of the clock signal.

The pixel unit 14 includes pixels including light emitting elements. Each pixel PXij may be connected to a corresponding data line and a corresponding scan line. Here, i and j may be integers greater than 0. The pixel PXij may mean a pixel in which a scan transistor is connected to an ith scan line and a jth data line.

Although not shown in the drawing, the display device DD may further include an emission driver. The emission driver may receive a clock signal, an emission stop signal, and the like from the timing controller 11, and generate emission signals to be provided to emission lines. For example, the emission driver may include emission stages connected to the emission lines. The emission stages may be configured in the form of shift registers. For example, a first emission stage may generate an emission signal of a turn-off level, based on the emission stop signal of the turn-off level, and the other emission stages may sequentially generate emission signals of the turn-off level, based on an emission signal of the turn-off level, which is generated by a previous emission stage of each thereof.

When the display device DD includes the above-described emission driver, each pixel PXij may further include a transistor connected to a corresponding emission line. The transistor may be turned off during a data writing period of each pixel PXij, to prevent light emission of the pixel PXij. Hereinafter, a case where the emission driver is not provided will be assumed and described.

The temperature sensor 16 may provide temperature information TINF. The temperature information TINF may be a peripheral temperature of the display device DD. For example, only one temperature sensor 16 may be provided in the display device DD.

The degradation compensator 15 may calculate predicted temperatures in units of pixels or in units of blocks, based on the input grayscales IGV and the temperature information TINF. For example, a predicted temperature of a pixel may be calculated such that, with respect to the peripheral temperature, the pixel has a higher predicted temperature as an input grayscale of the pixel becomes larger. In another embodiment, the degradation compensator 15 may more accurately calculate the predicted temperatures by using a current sensor (not shown) provided in the display device DD. For example, a predicted temperature of a pixel may be calculated such that, with respect to the peripheral temperature, the pixel has a higher predicted temperature as an input grayscale of the pixel becomes larger and a current flowing in the pixel becomes larger. The calculating of the predicted temperatures may be performed by adopting techniques which have already been disclosed. In another example, a plurality of temperature sensors 16 may be provided in units of pixels or in units of blocks.

The memory 17 may store degradation information including degradation degrees of the light emitting elements (or the pixels). The memory 17 may be a dedicated memory for implementing this embodiment or a portion of another memory (e.g., a frame memory) or a combination of both. The memory 17 may be implemented as the existing data storage device (e.g., a Static RAM (SRAM), a Dynamic RAM (DRAM), a Pseudo SRAM (PSRAM), a Synchronous DRAM (SDRAM), a Double Data Rate SDRAM (DDR SDRAM), or the like), and therefore, overlapping descriptions will omitted.

The degradation information may be accumulated information of degradation degrees of each pixel or each block until a recent update time of the display device DD from an initial operation time of the display device DD. For example, a degradation degree of the corresponding pixel or the corresponding block may become larger as the corresponding pixel or the corresponding block has a larger grayscale, has a higher temperature, and is used for a longer time. On the other hand, the degradation degree of the corresponding pixel or the corresponding block may become smaller as the corresponding pixel or the corresponding block has a smaller grayscale, has a lower temperature, and is used for a shorter time. In order to reduce memory cost, the memory 17 may not record accumulated information until past update times before the recent update time.

The degradation compensator 15 may receive the degradation information from the memory 17, and generate the output grayscales OGV by changing each of the input grayscales IGV of the pixels PXij, . . . to be in proportion to each of the degradation degrees.

Figure 2:
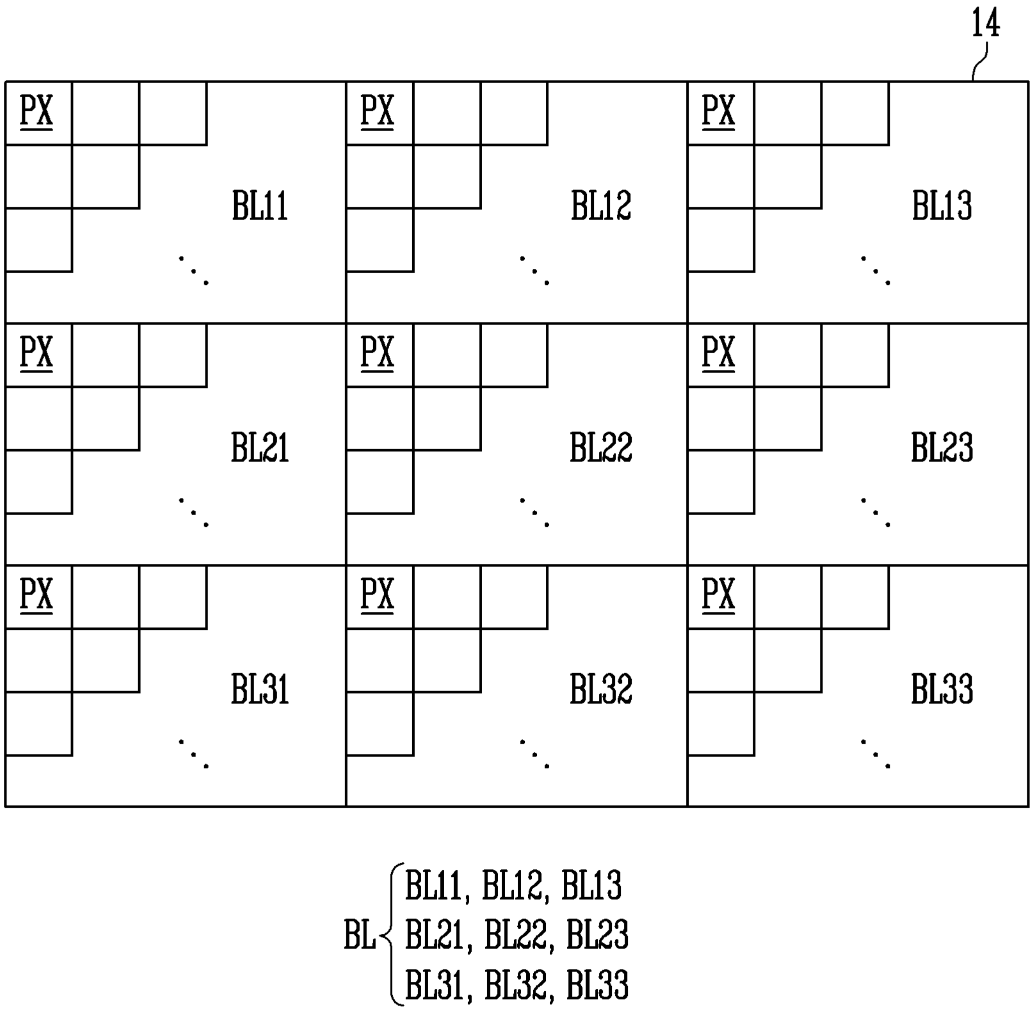
FIG. 2 is a diagram illustrating blocks in accordance with another embodiment of the present disclosure.

FIG. 2 is a diagram illustrating blocks in accordance with another embodiment of the present disclosure.

As shown in FIG. 2, pixels PX included in the pixel unit 14 may be divided into a plurality of blocks BL11, BL12, BL13, BL21, BL22, BL23, BL31, BL32, and BL33. For example, each of the blocks BL11 to BL33 may include the same number of pixels PX, and the blocks BL11 to BL33 may not overlap with each other. In another embodiment, the blocks BL11 to BL33 may include different numbers of pixels PX. In another embodiment, the blocks BL11 to BL33 may share at least some pixels PX (i.e., overlap with each other at at least some pixels PX).

A block BL is used to define a control unit of a plurality of pixels PX. The block BL is a virtual element, and is not any physical component. The block BL may be defined by being written in a memory before a product is released, and be actively redefined in a process of using the product.

In FIG. 2, for convenience of description, the blocks BL11 to BL33 formed with three rows and three columns are exemplified. However, the number of blocks BL is not limited thereto, and may be variously changed according to specifications (e.g., a size, a resolution, and the like) of the pixel unit 14.

For example, it is assumed that the pixels of the pixel unit 14 are configured as 3840*2160 pixels. Predicted temperatures may be calculated in a relative large block unit (e.g., one block includes 240*120 pixels), and degradation degrees may be stored in a relative small block unit (e.g., one block includes 8*8 pixels).

Data in the large block unit and data in the small block unit may be calculated by adjusting a unit (i.e., a number of pixels included in each block). For example, a large block unit may be calculated in a small block unit or an individual pixel unit by interpolating (e.g., bilinearly interpolating) adjacent large block units. Meanwhile, a small block unit or an individual pixel unit may be calculated in a large block unit by calculating an average value of adjacent small block units or adjacent pixel units. As described above, the individual pixel unit, the small block unit, and the large block unit may be used different from each other according to necessity (e.g., memory cost, accuracy, or the like), and be compatible with each other.

Hereinafter, for convenience of description, a case where calculation is performed in the individual pixel unit has been described, but it will be apparent that calculation in a block unit may be performed in conjunction with interpolation and average value calculation.

Figure 3:
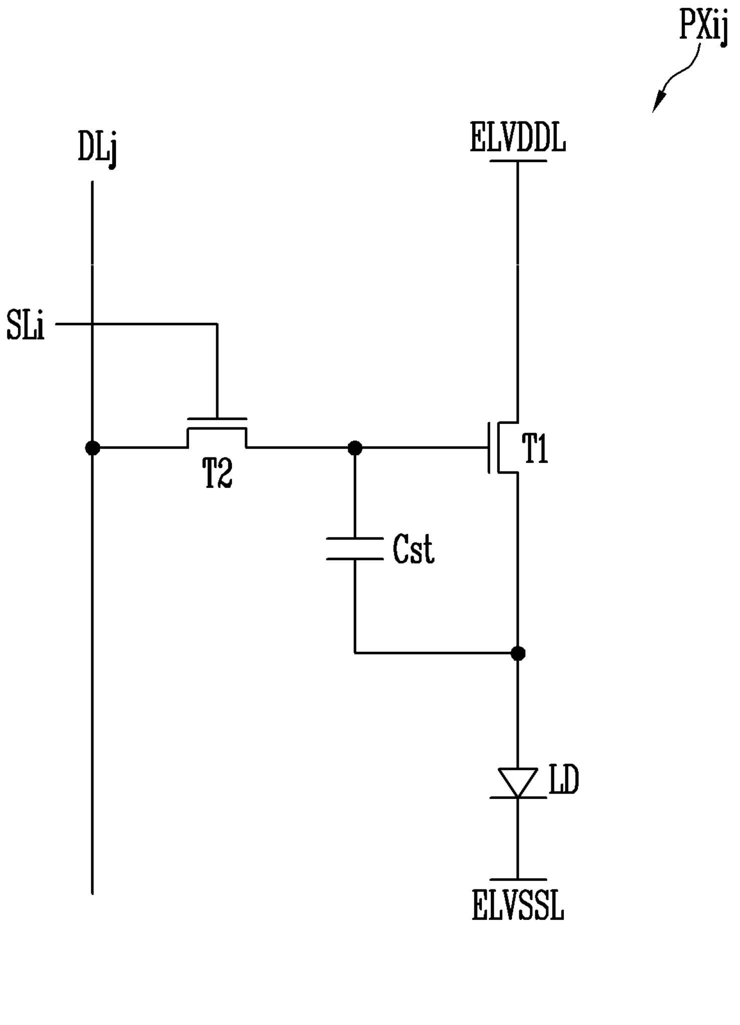
FIG. 3 is a diagram illustrating a pixel in accordance with an embodiment of the present disclosure.

FIG. 3 is a diagram illustrating a pixel in accordance with an embodiment of the present disclosure.

Referring to FIG. 3, the pixel PXij may include transistors T1 and T2, a storage capacitor Cst, and a light emitting element LD.

Hereinafter, a circuit implemented with an N-type transistor is described as an example. However, those skilled in the art may design a circuit implemented with a P-type transistor by changing the polarity of a voltage applied to a gate terminal. Similarly, those skilled in the art may design a circuit implemented with a combination of the P-type transistor and the N-type transistor. The P-type transistor refers to a transistor in which an amount of current flowing when the difference in voltage between a gate electrode and a source electrode increases in a negative direction increases. The N-type transistor refers to a transistor in which an amount of current flowing when the difference in voltage between a gate electrode and a source electrode increases in a positive direction increases. The transistor may be configured in various forms including a Thin Film Transistor (TFT), a Field Effect Transistor (FET), a Bipolar Junction Transistor (BJT), and the like.

A gate electrode of a first transistor T1 may be connected to a first electrode of the storage capacitor Cst, a first electrode of the first transistor T1 may be connected to a first power line ELVDDL, and a second electrode of the first transistor T1 may be connected to a second electrode of the storage capacitor Cst. The first transistor T1 may be referred to as a driving transistor.

A gate electrode of a second transistor T2 may be connected to an ith scan line SLi, a first electrode of the second transistor T2 may be connected to a jth data line DLj, and a second electrode of the second transistor T2 may be connected to the gate electrode of the first transistor T1. The second transistor T2 may be referred to as a scan transistor. Here, i and j may be integers greater than 0.

The first electrode of the storage capacitor Cst may be connected to the gate electrode of the first transistor T1, and the second electrode of the storage capacitor Cst may be connected to the second electrode of the first transistor T1.

An anode of the light emitting element LD may be connected to the second electrode of the first transistor T1, and a cathode of the light emitting element LD may be connected to a second power line ELVSSL. The light emitting element LD may be configured as an organic light emitting diode, an inorganic light emitting diode, a quantum dot/well light emitting diode, or the like. Meanwhile, the pixel PXij shown in FIG. 3 is exemplarily illustrated to include one light emitting element LD. However, in another embodiment, the pixel PXij may include a plurality of light emitting elements connected in series, parallel, or series/parallel.

A first power voltage may be applied to the first power line ELVDDL, and a second power voltage may be applied to the second power line ELVSSL. For example, during an image display period, the first power voltage may be higher than the second power voltage.

When a scan signal of a turn-on level (logic high level) is applied through the scan line SLi, the second transistor T2 is in a turn-on state. A data voltage applied to the data line DLj is stored in the first electrode of the storage capacitor Cst.

A positive driving current corresponding to a voltage difference between the first electrode and the second electrode of the storage capacitor Cst flows between the first electrode and the second electrode of the first transistor T1. Accordingly, the light emitting element LD emits light with a luminance corresponding to the data voltage.

Next, when a scan signal of a turn-off level (logic low level) is applied through the scan line SLi, the second transistor T2 is turned off, and the data line DLj and the first electrode of the storage capacitor Cst are electrically separated from each other. Thus, although the data voltage of the data line DLj is changed, the voltage stored in the first electrode of the storage capacitor Cst is not changed.

Embodiments may be applied to not only the pixel PXij shown in FIG. 3 but also a pixel of another pixel circuit. For example, when the display device DD further includes an emission driver, the pixel PXij may further include a transistor connected to an emission line.

Figure 4:
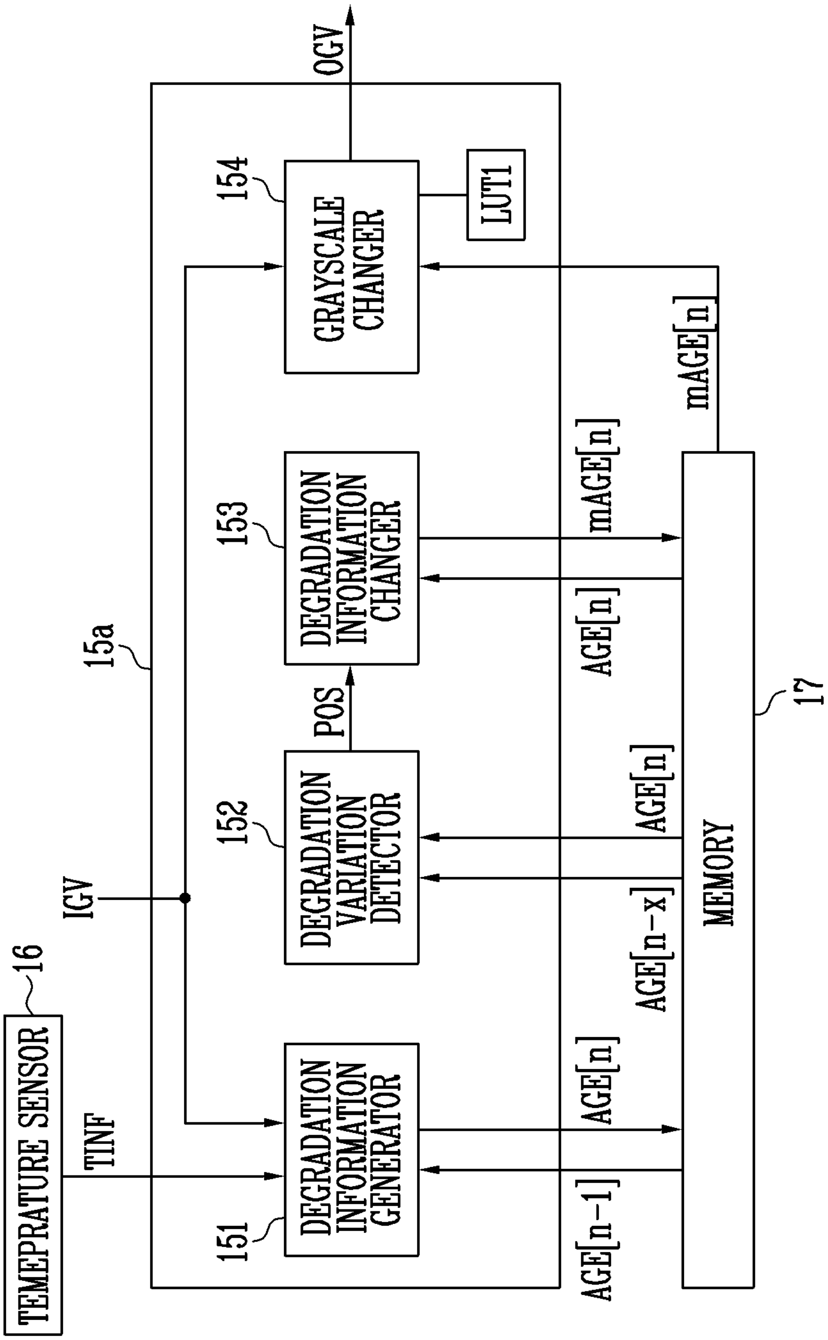
FIG. 4 is a diagram illustrating a degradation compensator in accordance with an embodiment of the present disclosure.

FIG. 4 is a diagram illustrating a degradation compensator in accordance with an embodiment of the present disclosure.

Referring to FIG. 4, the degradation compensator 15*a* in accordance with the embodiment of the present disclosure may include a degradation information generator 151, a degradation variation detector 152, a degradation information changer 153, a grayscale changer 154, and a first lookup table LUT1.

The degradation compensator 15*a* may receive degradation information AGE[n−1] from the memory 17, and generate output grayscales OGV by changing each of input grayscales IGV of the pixels to be in proportion to each of degradation degrees of the degradation information AGE[n−1].

The degradation information generator 151 may calculate current degradation amounts, based on temperature information TINF and the input grayscales IGV, and accumulate the current degradation amounts in the degradation information AGE[n−1], thereby updating the degradation information AGE[n−1]. For example, the updated degradation information AGE[n−1] may be calculated as shown in the following Equation 1.

$$AGE[n]=AGE[n-1]+CDAs[n] \quad \text{Equation 1}$$

AGE[n−1] may be degradation information AGE[n−1] in which degradation amounts from a first image frame to an (n−1)th image frame are accumulated. AGE[n] may be degradation information AGE[n] in which degradation amounts from the first image frame to the nth image frame are accumulated. Here, n may be an integer greater than 1. CDAs[n] may be current degradation amounts CDAs[n] calculated based on input grayscales IGV of the nth image frame and related temperature information TINF. For example, the degradation information generator 151 may calculate the current degradation amounts CDAs[n] such that the current degradation amounts CDAs[n] become larger as predicted temperatures based on the temperature information TINF become higher. The degradation information generator 151 may directly calculate the current degradation amounts CDAs[n], based on the input grayscales IGV and the temperature information INF, and refer to a pre-store lookup table.

The degradation variation detector 152 may calculate variations by using differences between degradation degrees of current degradation information AGE[n] and degradation degrees of past degradation information AGE[n-x], and provide position information POS of a pixel corresponding to a variation greater than a threshold value among the variations. The position information POS may correspond to a position of a pixel, at which it is predicted that an afterimage will occur (e.g., at which it is predicted that a logo will exist).

Here, x may be an integer greater than 1. For example, when the display device DD displays an image frame at 60 Hz, x may be set as 10800 so as to measure a variation for a unit time of three minutes. Since an image is continuously changed, the position information POS may be inaccurate when x is too small. The degradation variation detector 152 may read degradation information AGE[n-x] and AGE[n] corresponding to the unit time from the memory 17 for every corresponding time n-x and n.

The degradation information changer 153 may generate changed degradation information mAGE[n] by decreasing a degradation degree having a variation greater than the threshold value among variations of degradation degrees and changing the degradation information AGE[n]. The degradation information changer 153 may generate the changed degradation information mAGE[n] by decreasing a degradation degree corresponding to the position information POS and changing the degradation information AGE[n]. For example, the degradation information changer 153 may decrease the degradation degree corresponding to the position information POS by a predetermined value. For example, when the degradation degree corresponding to the position information POS in the degradation information AGE[n] is 43, the degradation information changer 153 may generate the changed degradation information mAGE[n] by the degradation degree corresponding to the position information POS to 40.

For example, the degradation information changer 153 may decrease the degradation degree by using the following Equation 2.

$$mAGE=AGE*ST+OFST \quad \text{Equation 2}$$

mAGE may be a degradation degree after change, which is included in the changed degradation information mAGE [n], AGE may be a degradation degree before change, which is included in the changed degradation information mAGE [n], ST may be a control coefficient, and OFST may be a control offset.

The degradation information changer 153 may maintain ST as 1 and maintain OFST as 0 with respect to a degradation degree not corresponding to the position information POS. That is, mAGE may be equal to AGE.

Meanwhile, the degradation information changer 153 may decrease ST and OFST with respect to the degradation degree corresponding to the position information POS. For example, ST may be set as 0.9, and OFST may be set as a negative number. ST and OFST may be predetermined values. mAGE may be smaller than AGE.

Meanwhile, the degradation information changer 153 may calculate mAGE through the following Equation 3 or 4.

$$mAGE=AGE+OFST \quad \text{Equation 3}$$

The degradation information changer 153 may maintain OFST as 0 with respect to the degradation degree not corresponding to the position information POS. That is, mAGE may be equal to AGE.

Meanwhile, the degradation information changer 153 may decrease OFST with respect to the degradation degree corresponding to the position information POS. For example, OFST may be set as a negative number. OFST may be a predetermined value. mAGE may be smaller than AGE.

$$mAGE=AGE*ST \quad \text{Equation 4}$$

The degradation information changer 153 may maintain ST as 1 with respect to degradation degree not corresponding to the position information POS. That is, mAGE may be equal to AGE.

Meanwhile, the degradation information changer 153 may decrease ST with respect to the degradation degree corresponding to the position information POS. For example, ST may be set as 0.9. ST may be a predetermined value. mAGE may be smaller than AGE.

For example, when the memory 17 is a Double Data Rate (DDR) memory, the degradation information changer 153 may correspond to a DDR controller.

The grayscale changer 154 may generate output grayscales OGV corresponding to the input grayscales IGV and the changed degradation information mAGE[n] with reference to the first lookup table LUT1. In general, the output grayscales OGV may be greater than or equal to the corresponding input grayscales IGV. The grayscale changer 154 may generate an output grayscale having a greater difference from a corresponding input grayscale as a pixel has a larger degradation degree. Meanwhile, the grayscale changer 154 may generate an output grayscale having a smaller difference from a corresponding input grayscale as a pixel has a smaller degradation degree.

In accordance with this embodiment, an image processing process for searching for a logo may be omitted by using the degradation variation detector 152. In accordance with this embodiment, a luminance corresponding to degradation is increased by using the grayscale changer 154, and a luminance decrease for preventing an afterimage is performed together with the luminance increase by using the degradation information changer 153, so that balance between degradation counteraction and afterimage prevention can be kept.

Figures 5, 6A:
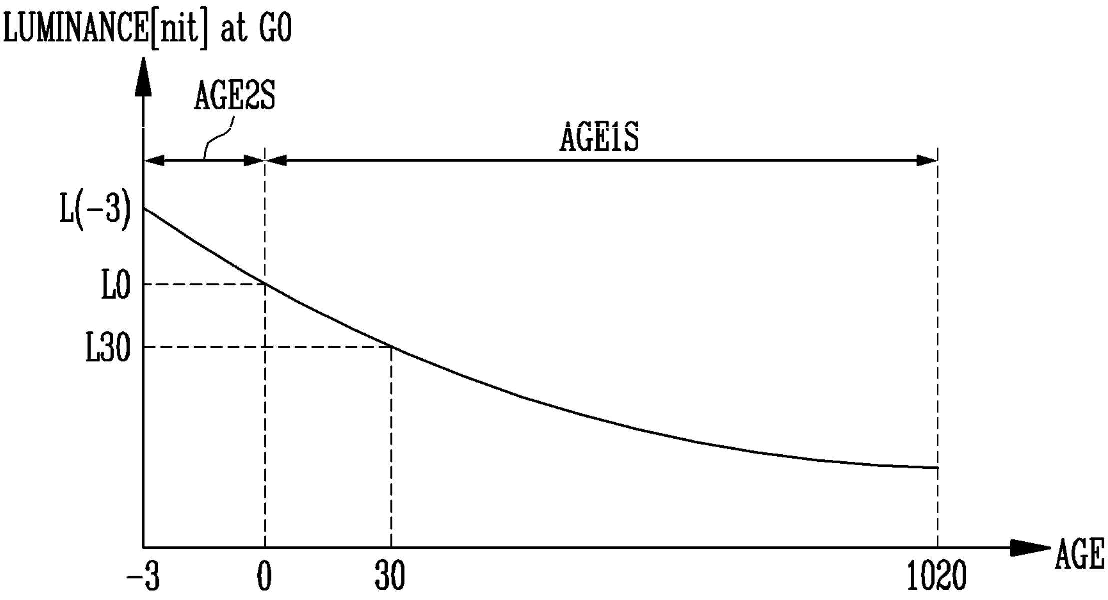
FIGS. 5, 6A, and 6B are diagrams illustrating a first lookup table in accordance with an embodiment of the present disclosure.
Figure 6B:
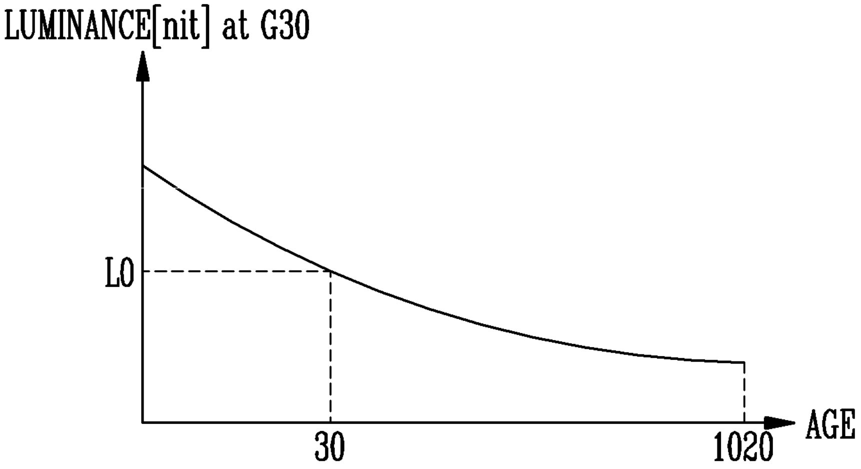

FIGS. 5, 6A, and 6B are diagrams illustrating a first lookup table in accordance with an embodiment of the present disclosure.

Referring to FIG. 5, a graph representing a luminance corresponding to degradation degree AGE of a pixel PX is exemplarily illustrated. For example, the graph shown in FIG. 5 is based on a case where an input grayscale is a grayscale G0, and graphs for other input grayscales may be different from the graph shown in FIG. 5.

Referring to FIG. 5, the pixel PX may emit light with a luminance L0when the grayscale G0 is initially used as an input grayscale and an output grayscale (i.e., an initial degradation degree (AGE=0). However, when degradation of the pixel PX progresses (e.g., the degradation degree AGE is changed from 0 to 30), the pixel PX may emit light with a luminance L30 darker than the luminance L0when the grayscale G0 is used as the input grayscale and the output grayscale.

Therefore, when the degradation degree AGE of the pixel PX is 30 and the input grayscale is the grayscale G0, the grayscale changer 154 may set the output grayscale as a grayscale G30 with reference to the first lookup table LUT1, so that the pixel PX can emit light with a target luminance L0(see FIGS. 6A and 6B). The grayscale G30 may be greater than the grayscale G0.

Referring to FIG. 6A, the first lookup table LUT1 is exemplarily illustrated. With respect to each of the input grayscales IGV, the output grayscales OGV may increase as the degradation degree AGE becomes larger.

The first lookup table LUT1 may include output grayscales A0 to Z1020 corresponding to first degradation degrees AGE greater than or equal to the initial degradation degree (AGE=0) set at first with respect to pixels PX and output grayscales A(−3) to Z(−1) corresponding to second degradation degrees AGE2S smaller than the initial degradation degree (AGE=0).

The output grayscales A0 to Z1020 corresponding to the first degradation degrees AGE1S in the first lookup table LUT1 may be greater than or equal to corresponding input grayscales IGV. For example, output grayscales A0, B0, C0, G0, and Z0 may be equal to corresponding input grayscales 0, 1, 2, 3, G0, and 255. Meanwhile, output grayscales A30, B30, C30, D30, G30, Z30, A1020, B1020, C1020, D1020, G1020, and Z1020 may be greater than corresponding input grayscales 0, 1, 2, 3, G0, and 255.

Meanwhile, the output grayscales A(−3) to Z(−1) corresponding to the second degradation degrees AGE2S in the first lookup table LUT1 may be smaller than or equal to corresponding input grayscales IGV. For example, the degradation information changer 153 is to decrease the degradation degree AGE so as to prevent an afterimage, even when pixels PX display a logo with a high luminance from a time at which the display device DD is driven at first (i.e., the degradation degree AGE of the pixels PX is 0). Therefore, although any minus degradation does not actually exist, the first lookup table LUT1 may include the output grayscales A(−3) to Z(−1) corresponding to the second degradation degrees AGE2S.

Figure 7:
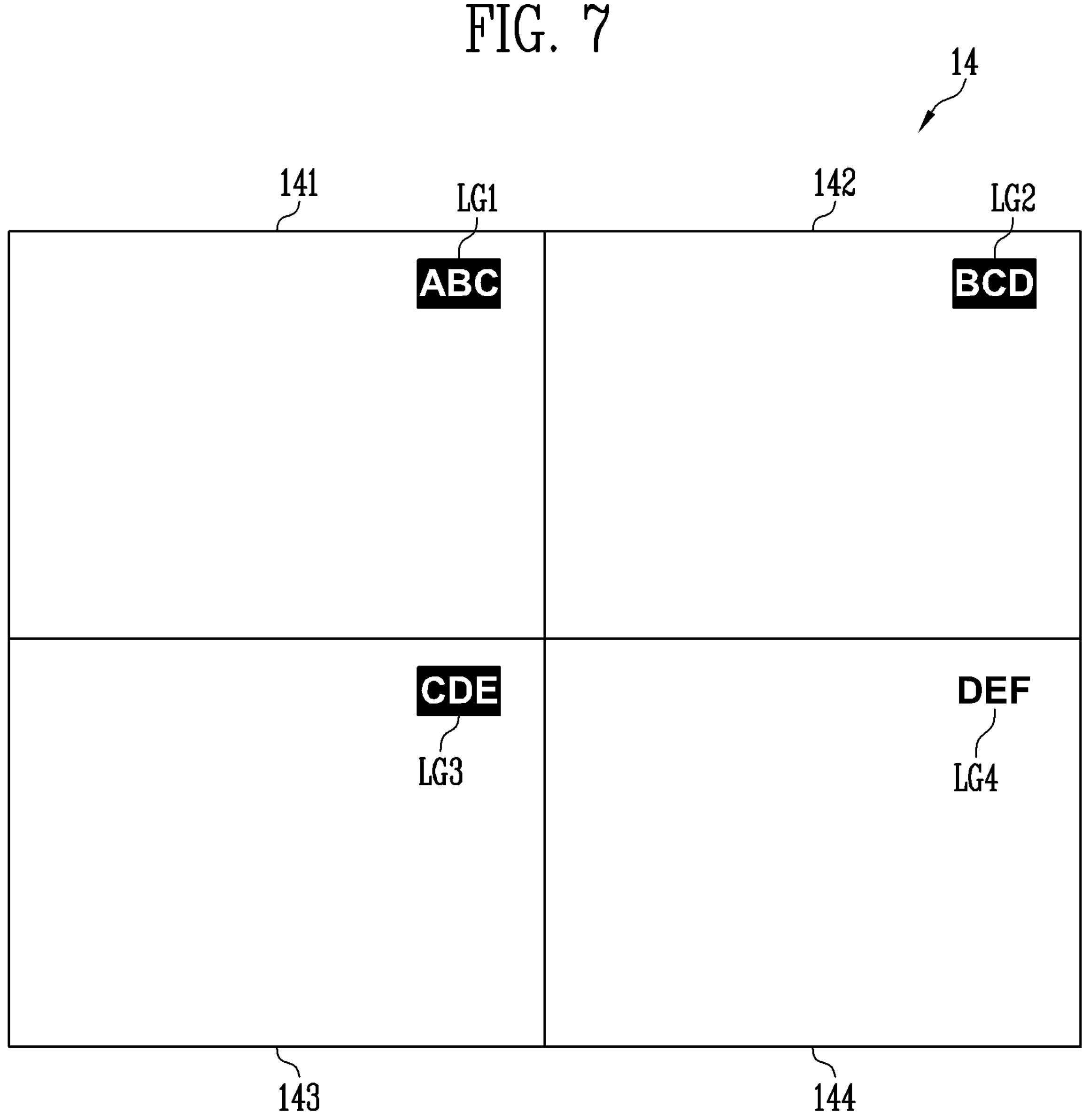
FIG. 7 is a diagram illustrating an effect of a degradation compensator in accordance with an embodiment of the present disclosure.

FIG. 7 is a diagram illustrating an effect of the degradation compensator in accordance with an embodiment of the present disclosure.

Referring to FIG. 7, the pixel unit 14 may be divided into four division areas 141, 142, 143, and 144, and the division areas 141, 142, 143, and 144 may display images independent from one another. A first division area 141 may display a first logo LG1, a second division area 142 may display a second logo LG2, a third division area 143 may display a third logo LG3, and a fourth division area 144 may display a fourth logo LG4.

It is assumed that each of the logos LG1 to LG4 is displayed for a unit time (e.g., three minutes) or more. When the degradation information changer 153 changes degradation information AGE[n] to changed degradation information mAGE[n], the degradation information changer 153 may decrease degradation degrees of pixels PX corresponding to the first to third logos LG1, LG2, and LG3 with a high luminance (e.g., white letters), and maintain a degradation degree of pixels PX corresponding to the fourth logo LG4 with a low luminance (e.g., black letters). Accordingly, degradation compensation and afterimage prevention can be applied to the pixels PX corresponding to the first to third logos LG1, LG2, and LG3, and degradation compensation can be applied to the pixels PX corresponding to the fourth logo LG4.

Figure 8:
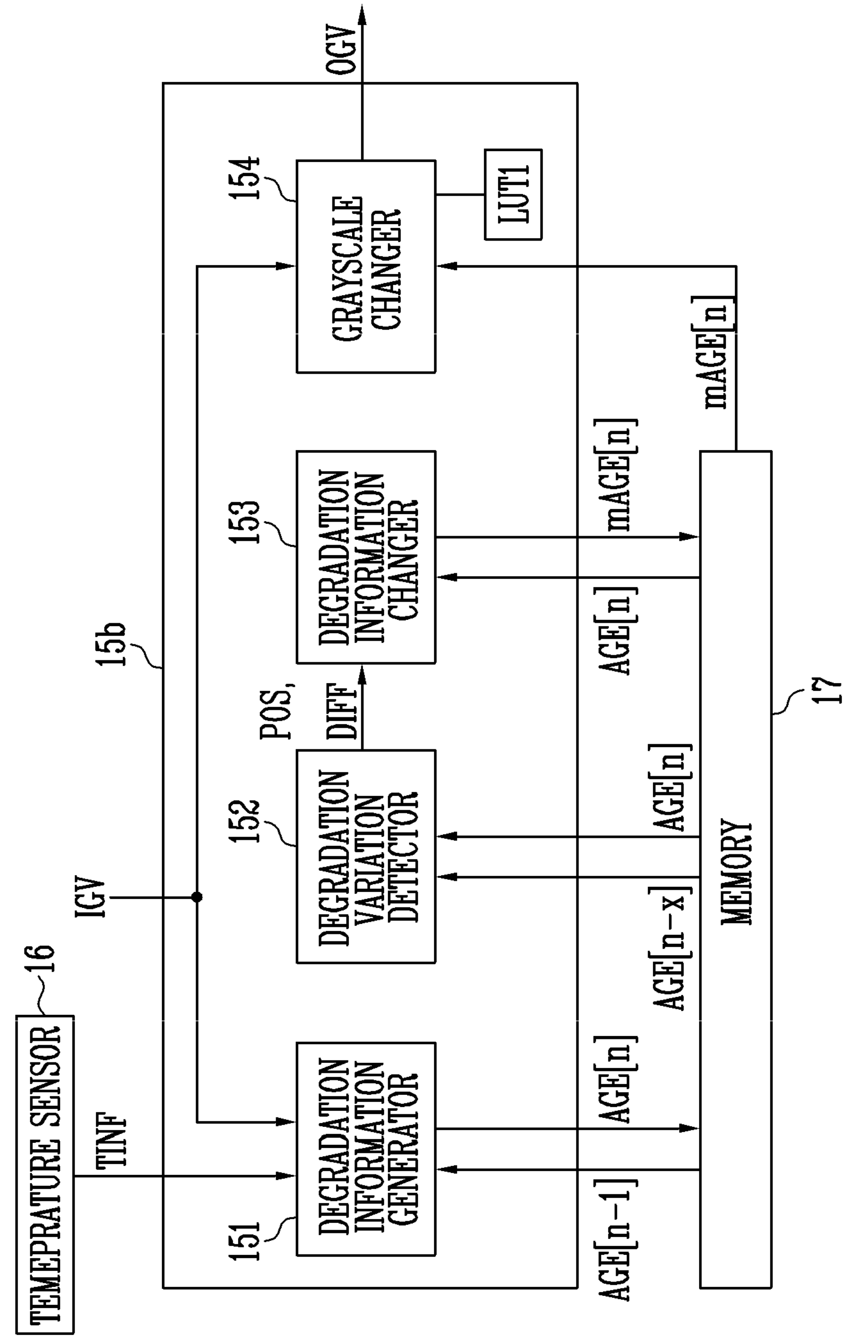
FIG. 8 is a diagram illustrating a modification of the degradation compensator shown in FIG. 4.

FIG. 8 is a diagram illustrating a modification of the degradation compensator shown in FIG. 4.

A degradation compensator **15*b* shown in FIG. 8 is different from the degradation compensator 15*a* shown in FIG. 4, in that a difference value DIFF is further provided from the degradation variation detector 152 to the degradation information changer 153. Hereinafter, in the degradation compensator 15*b* shown in FIG. 8, descriptions of portions overlapping with those of the degradation compensator 15*a* shown in FIG. 4** will be omitted.

The degradation variation detector 152 may calculate variations by using differences between degradation degrees of current degradation information AGE[n] and degradation degrees of past degradation information AGE[n-x], and provide position information POS of a pixel PX corresponding to a variation greater than the threshold value among the variations and a difference value DIFF between the variation and peripheral variations.

For example, referring to FIG. 7, position information POS of pixels which display white letters of the first to third logos LG1, LG2, and LG3 may be provided. In addition, a difference value between variations of peripheral pixels which display a black box surrounding the white letters and variations of the pixels which display the white letters may be provided.

The degradation information changer 153 may generate changed degradation information mAGE[n] by decreasing a degradation degree corresponding to the position information POS in proportion to the difference value DIFF and changing the degradation information AGE[n]. The degradation information changer 153 may decrease the degradation degree corresponding to the position information POS to become smaller as the difference value DIFF becomes larger.

For example, the degradation information changer 153 may increase a decrement of the degradation degree as the difference value DIFF becomes larger. Referring to the above-described Equations 2, 3, and 4, the degradation information changer 153 may increase a decrement of at least one of ST and OFST as the difference value DIFF becomes larger.

In accordance with this embodiment, when a degradation degree is decreased, a predetermined value is not used, but an afterimage contribution degree can be reflected in real time. Thus, more accurate afterimage prevention is possible.

Figure 9:
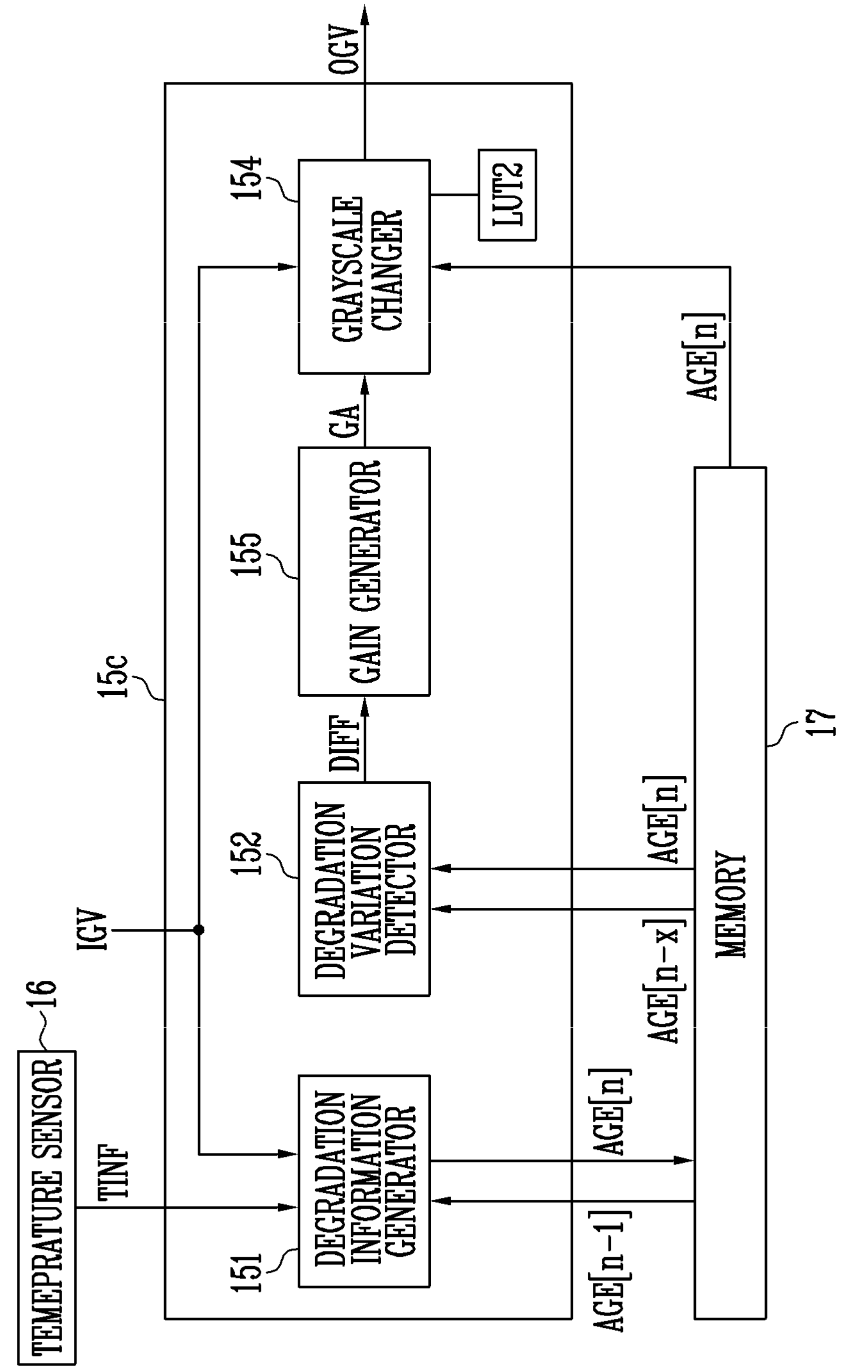
FIG. 9 is a diagram illustrating a degradation compensator in accordance with another embodiment of the present disclosure.

FIG. 9 is a diagram illustrating a degradation compensator in accordance with another embodiment of the present disclosure.

A degradation compensator **15*c* shown in FIG. 9 is different from the degradation compensators 15*a* and 15*b* shown in FIGS. 4 and 8, in that the degradation information changer 153 is removed and a gain generator 155 is added. Hereinafter, in the degradation compensator 15*c*, descriptions of portions overlapping with those of the degradation compensators 15*a* and 15*b*** will be omitted.

When a degradation degree having a variation greater than the threshold value among variations of degradation degrees is detected, the degradation compensator **15*c*** may apply a gain value GA to at least one of output grayscales OGV.

The degradation variation detector 152 may calculate variations by using differences between degradation degrees of current degradation information AGE[n] and degradation degrees of past degradation information AGE[n-x], and provide a difference value DIFF between a variation greater than the threshold value among the variations and peripheral variations.

The gain generator 155 may generate a gain value GA in proportion to the different value DIFF. For example, the gain value GA may have a range of 0 or more and 1 or less. When a unit is %, the gain value GA may have a range of 0% or more and 100% or less. For example, the gain generator 155 may increase a decrement of the gain value GA as the difference value DIFF becomes larger. That is, the gain generator 155 may generate a smaller gain value GA as the difference value DIFF becomes larger.

The grayscale changer 154 may commonly apply the gain value GA with respect to all the output grayscales OGV. That the grayscale changer 154 calculates output grayscales OGV with reference to input grayscales IGV and a second lookup table LUT2 is similar to as described above with reference to FIGS. 4 to 6, and therefore, overlapping descriptions will not be repeated. For example, the grayscale changer 154 may first calculate the output grayscales OGV with reference to the input grayscales IGV and the second lookup table LUT2, and generate final output grayscales OGV by multiplying the calculated output grayscales OGV by the gain value GA.

FIG. 10 is a diagram illustrating a second lookup table in accordance with an embodiment of the present disclosure.

Output grayscales A0 to Z1023 of degradation degrees AGE of the second lookup table LUT2 correspond to the output grayscales A0 to Z1020 of the first degradation degrees AGE1S shown in FIG. 6. When assuming that the first lookup table LUT1 and the second lookup table LUT2 use the same memory capacity, a resolution of the output grayscales A0 to Z1023 of the degradation degrees AGE of the second lookup table LUT2 may be higher than a resolution of the output grayscales A0 to Z1020 of the first degradation degrees AGE1S shown in FIG. 6. This results from that the degradation degrees AGE of the second lookup table LUT2 do not include the second degradation degrees AGE2S shown in FIG. 6. Since the degradation compensator 15*c* shown in FIG. 9 does not include the degradation information changer 153 which decreases the degradation degrees AGE, output grayscales corresponding to the second degradation degrees AGE2S are unnecessary in the second lookup table LUT2.

In accordance with this embodiment, a luminance increase for counteracting degradation and a luminance decrease for preventing an afterimage can be balanced, and an image processing process for searching for a logo can be omitted.

Figure 11:
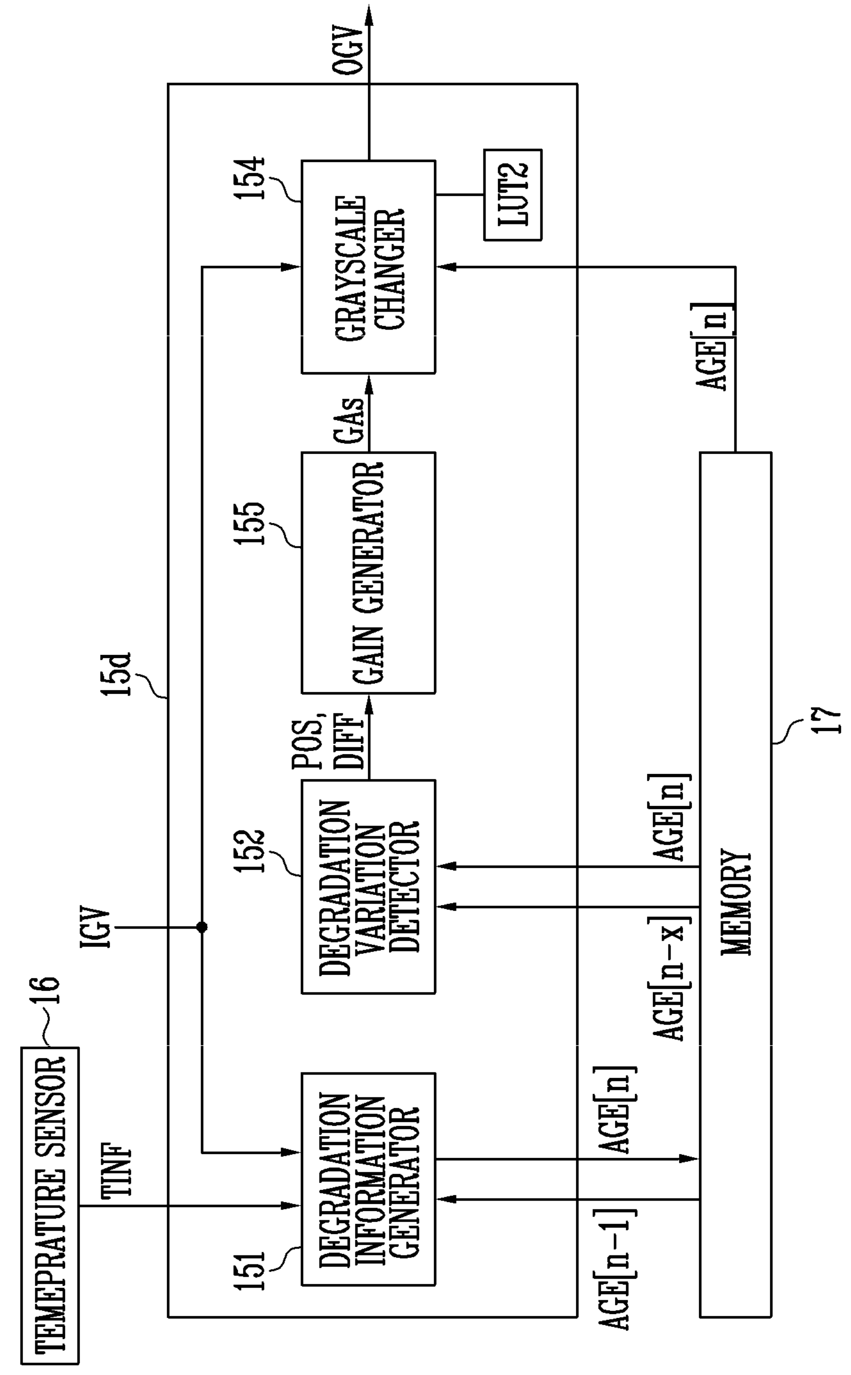
FIG. 11 is a diagram illustrating a modification of the degradation compensator shown in FIG. 9.

FIG. 11 is a diagram illustrating a modification of the degradation compensator shown in FIG. 9.

A degradation compensator 15*d* shown in FIG. 11 is different from the degradation compensators 15*a*, 15*b*, and 15*c* shown in FIGS. 4, 8, and 9, in that position information POS is further provided from the degradation variation detector 152 to the gain generator 155 and in that a plurality of gain values GAs are provided from the gain generator 155 to the grayscale changer 154. Hereinafter, in the degradation compensator 15*d*, descriptions of portions overlapping with those of the degradation compensators 15*a*, 15*b*, and 15*c* will be omitted.

The degradation variation detector 152 may calculate variations by using differences between degradation degrees of current degradation information AGE[n] and degradation degrees of past degradation information AGE[n-x], and provide position information POS of a pixel PX corresponding to a variation greater than the threshold value among the variations and a difference value DIFF between the variation and peripheral variations.

The gain generator 155 may generate a first gain value corresponding to the position information POS in proportion to the difference value DIFF. The gain generator 155 may decrease the gain value corresponding to the position information POS to become smaller as the difference value DIFF becomes larger. Meanwhile, the gain generator 155 may generate a second gain value (e.g., 1) not corresponding to the position information POS. For example, the gain generator 155 may provide the first gain value smaller than 1 with respect to pixels corresponding to a logo, and provide the second gain value as 1 with respect to pixels not corresponding to the logo. A plurality of gain values GAs may include the first gain value and the second gain value.

The grayscale changer 154 may apply the first gain value to some of output grayscales OGV, which correspond to the position information POS. The grayscale changer 154 may apply the second gain value to the others (or other some) of the output grayscales OGV, which do not correspond to the position information POS.

While the gain value GA in the embodiment shown in FIG. 9 is applied to all the pixels, the gain values GAs in the embodiment shown in FIG. 11 are applied to each of partial areas of the pixel unit 14, which is different from each other. Particularly, in accordance with FIG. 11, luminances of the pixels corresponding to the logo may be relatively further decreased.

Meanwhile, in this embodiment, a case where the plurality of gain values GAs include two gain values is described as an example. However, in the embodiment shown in FIG. 7, the plurality of gain values GAs may include a first gain value (applied to the first logo LG1), a second gain value (applied to the second logo LG2), a third gain value (applied to the third logo LG3), and a fourth gain value (applied to the other pixels).

In accordance with the present disclosure, the display device can balance a luminance increase for counteracting degradation and a luminance decrease for preventing an afterimage, and omit an image processing process for searching for a logo.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, or elements described in connection with a particular embodiment may be used singly or in combination with features, characteristics, or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

pixels including light emitting elements;

a memory configured to store degradation information including degradation degrees of the light emitting elements; and a degradation compensator configured to receive the degradation information, and generate output grayscales by changing each of input grayscales of the pixels in proportion to each of the degradation degrees, wherein the degradation compensator includes a degradation information changer configured to change the degradation information by decreasing a degradation degree having a variation greater than a threshold value among variations of the degradation degrees, wherein the degradation compensator further includes a grayscale changer configured to generate the output grayscales corresponding to the input grayscales and the changed degradation information with reference to a first lookup table, and wherein the first lookup table includes output gray scales corresponding to first degradation degrees greater than or equal to an initial degradation degree set initially with respect to the pixels and output grayscales corresponding to second degradation degrees smaller than the initial degradation degree.

2. The display device of claim 1, wherein the output grayscales corresponding to the second degradation degrees in the first lookup table are smaller than or equal to corresponding input grayscales.

3. The display device of claim 2, wherein the output grayscales corresponding to the first degradation degrees in the first lookup table are greater than or equal to corresponding input grayscales.

4. A display device comprising:

pixels including light emitting elements;

a memory configured to store degradation information including degradation degrees of the light emitting elements;

a degradation compensator configured to receive the degradation information, and generate output grayscales by changing each of input grayscales of the pixels in proportion to each of the degradation degrees; and a temperature sensor configured to provide temperature information, wherein the degradation compensator includes a degradation information changer configured to change the degradation information by decreasing a degradation degree having a variation greater than a threshold value among variations of the degradation degrees, wherein the degradation compensator further includes a degradation information generator configured to update the degradation information by calculating current degradation amounts, based on the temperature information and the input grayscales and accumulating the current degradation amounts in the degradation information, and wherein the degradation compensator further includes a degradation variation detector configured to calculate the variations by using differences between degradation degrees of current degradation information and degradation degrees of past degradation information, and provide position information of a pixel corresponding to the variation greater than the threshold value among the variations.

5. The display device of claim 4, wherein the degradation information changer changes the degradation information by decreasing the degradation degree corresponding to the position information.

6. A display device comprising:

pixels including light emitting elements;

a memory configured to store degradation information including degradation degrees of the light emitting elements;

a degradation compensator configured to receive the degradation information, and generate output grayscales by changing each of input grayscales of the pixels in proportion to each of the degradation degrees; and a temperature sensor configured to provide temperature information, wherein the degradation compensator includes a degradation information changer configured to change the degradation information by decreasing a degradation degree having a variation greater than a threshold value among variations of the degradation degrees, wherein the degradation compensator further includes a degradation information generator configured to update the degradation information by calculating current degradation amounts, based on the temperature information and the input grayscales and accumulating the current degradation amounts in the degradation information, and wherein the degradation compensator further includes a degradation variation detector configured to calculate the variations by using differences between degradation degrees of current degradation information and degradation degrees of past degradation information, and provide position information of a pixel corresponding to the variation greater than the threshold value among the variations and a difference value between the variation and peripheral variations.

7. The display device of claim 6, wherein the degradation information changer changes the degradation information by decreasing the degradation degree corresponding to the position information in proportion to the difference value.

8. The display device of claim 7, wherein the degradation information changer decreases the degradation degree corresponding to the position information to become smaller as the difference value becomes larger.

9. A display device comprising:

pixels including light emitting elements;

a memory configured to store degradation information including degradation degrees of the light emitting elements;

a degradation compensator configured to receive the degradation information, and generate output grayscales by changing each of input grayscales of the pixels in proportion to each of the degradation degrees; and a temperature sensor configured to provide temperature information, wherein, in operation, when a degradation degree having a variation greater than a threshold value among variations of the degradation degrees is detected, the degradation compensator applies a gain value to at least one of the output grayscales, wherein the degradation compensator further includes a degradation information generator configured to update the degradation information by calculating current degradation amounts, based on the temperature information and the input grayscales and accumulating the current degradation amounts in the degradation information, and wherein the degradation compensator further includes a degradation variation detector configured to calculate the variations by using differences between degradation degrees of current degradation information and degradation degrees of past degradation information, and provide position information of a pixel corresponding to the variation greater than the threshold value among the variations.

10. The display device of claim 9, wherein the gain value has a range of and including 0 to 1.

11. The display device of claim 9, wherein the degradation compensator further includes:

a gain generator configured to generate the gain value in proportion to the difference value; and a grayscale changer configured to commonly apply the gain value to all the output gray scales.

12. The display device of claim 11, wherein the gain generator decreases the gain value to become smaller as the difference value becomes larger.

13. A display device comprising:

pixels including light emitting elements;

a memory configured to store degradation information including degradation degrees of the light emitting elements;

a degradation compensator configured to receive the degradation information, and generate output grayscales by changing each of input grayscales of the pixels in proportion to each of the degradation degrees; and a temperature sensor configured to provide temperature information, wherein, in operation, when a degradation degree having a variation greater than a threshold value among variations of the degradation degrees is detected, the degradation compensator applies a gain value to at least one of the output grayscales, wherein the degradation compensator further includes a degradation information generator configured to update the degradation information by calculating current degradation amounts, based on the temperature information and the input grayscales and accumulating the current degradation amounts in the degradation information, and wherein the degradation compensator further includes a degradation variation detector configured to calculate the variations by using differences between degradation degrees of current degradation information and degradation degrees of past degradation information, and provide position information of a pixel corresponding to the variation greater than the threshold value among the variations and a difference value between the variation and peripheral variations.

14. The display device of claim 13, wherein the degradation compensator further include:

a gain generator configured to generate the gain value corresponding to the position information in proportion to the difference value; and a grayscale changer configured to apply the gain value to some of the output grayscales, which correspond to the position information.

15. The display device of claim 14, wherein the gain generator decreases the gain value corresponding to the position information to become smaller as the difference value becomes larger.

* * * * *